United States Patent Office 3,454,059
Patented July 8, 1969

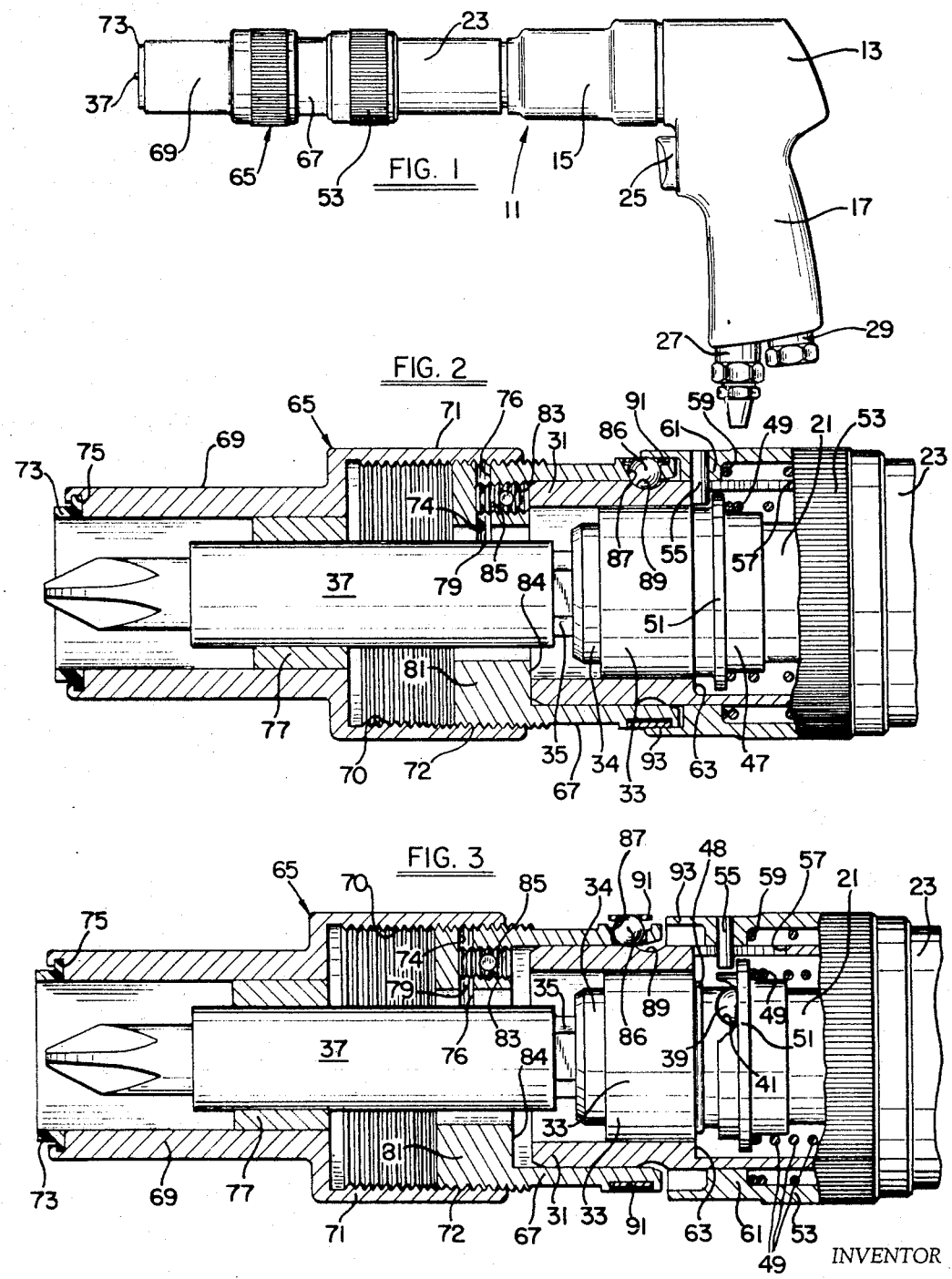

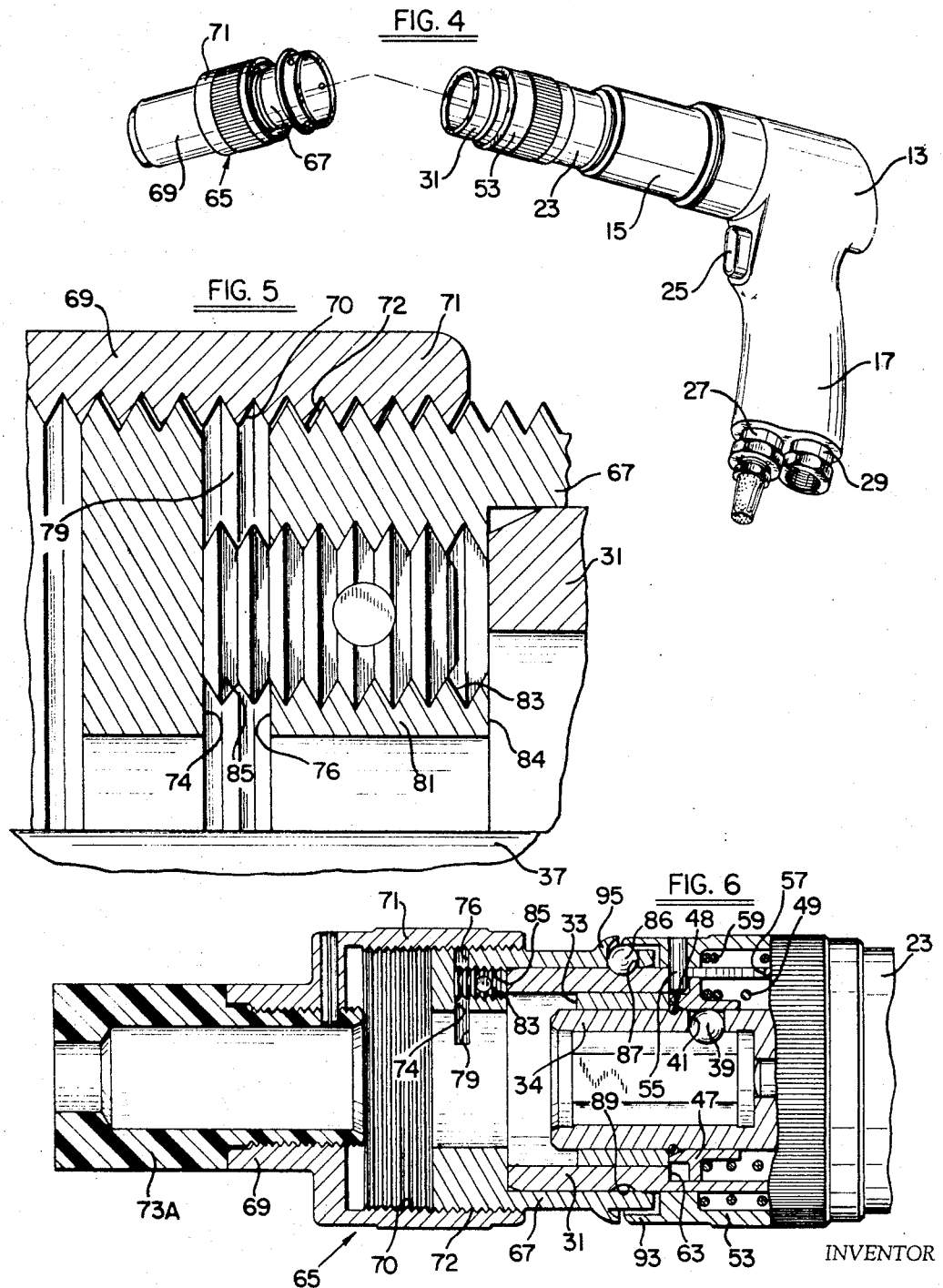

3,454,059
ATTACHING AND ADJUSTING CONSTRUCTION FOR DEPTH LOCATING ACCESSORY
William F. Sindelar, Towson, Md., assignor to The Black and Decker Manufacturing Company, Towson, Md., a corporation of Maryland
Filed Oct. 2, 1967, Ser. No. 672,124
Int. Cl. B65b 25/00; B23b 47/00
U.S. Cl. 144—32         22 Claims

ABSTRACT OF THE DISCLOSURE

The device disclosed herein is a portable, power-operated screwdriver and includes a housing and a pendant-type handle. An air-driven motor within the housing is adapted to rotate a spindle and is controlled by a handle-mounted trigger. A manually releasable, tool bit retainer is provided to couple a tool bit to the spindle and an adjustable depth locator sleeve is removably secured to the housing.

---

This invention relates generally to power-operated tools, and particularly to an improved depth locator attaching and adjusting construction for power-operated screwdrivers, drills and the like.

Summary of the invention

The invention includes an improved, quick-release and tamper proof attaching and adjusting construction for a depth locator adapted for use with power-operated screwdrivers, drills and the like which comprises sleeve-like means at one end adapted to slidably fit on the forward end of a tool housing and which is retained thereon by detent means. The other end of the locator encompasses a tool bit which extends forwardly of the housing and is positioned to engage a work surface during tool use and provide a positive stop for tool advance. The depth locator is made up of at least two parts threaded together for length adjustment (and tool advance adjustment) and means is provided to lock these two parts together after adjustment, which means is inaccessible after the locator is in place on the tool housing. In addition, the detent means is locked in place by a manually operable member on the tool housing, which member may also serve to lock a tool bit retainer in place.

Main objects of the present invention are to provide an improved attaching and adjusting construction for a depth locator adapted for use with a power-operated screwdriver, drill and the like, which construction is both positively retained in place and yet is readily, manually removable without the use of tools, and which is adjustable to vary the tool advance but is tamper proof when in place.

Additional objects of the present invention are to provide an improved depth locator attaching and adjusting construction of the above character which embodies a manually releasable retainer which may also serve as a manually releasable tool bit retainer, and which construction also embodies a non-marring work surface engaging end.

Further objects include the provision of a depth locator attaching and adjusting construction of the above character which is relatively inexpensive to manufacture, rugged in construction and reliable in use.

Other objects and advantages of the present invention will become more apparent from a consideration of the drawings annexed thereto together with the detailed description hereinbelow.

Brief description of the drawings

FIG. 1 is a side elevational view illustrating a power-operated screwdriver embodying the present invention;
FIG. 2 is an enlarged sectional view of the depth locator embodied in FIG. 1;
FIG. 3 is a view similar to FIG. 2 but with the parts in position for removal of the depth locator from the tool housing;
FIG. 4 is a perspective view showing the depth locator removed from the tool:
FIG. 5 is an enlarged sectional view illustrating the tamper-proof adjustment locking means for the depth locator; and
FIG. 6 is a view, similar to FIG. 2, illustrating a modified form of the present invention.

Broad statement of the invention

Broadly described, the present invention relates to a power-operated tool of the type having a housing, a spindle rotatably supported within said housing and adapted for operative connection to a power source, said spindle adapted to have a tool bit coupled thereto for rotation therewith, and depth locator means engageable with a work surface for limiting the advance of said tool bit relative thereto, and includes the improvement wherein said depth locator means comprises first and second relatively longitudinally adjustable members and together forming an elongated body having a rearward end positionable on said housing and a forward end adapted to encompass said tool bit, cooperable detent means on said body rearward end and said housing for retaining said body on said housing, and releasable means for locking said first and second members together in selected longitudinally adjusted positions, said locking means being accessible only when said body is removed from said housing.

In another aspect, the present invention includes a power-operated tool comprising a housing having a forward, tubular portion, drive means within said housing, a spindle extending forwardly into said tubular housing portion and adapted to be rotated by said drive means, said spindle being adapted to have a tool bit coupled thereto for rotation therewith, depth locator means including first and second threadedly interconnected members together defining an elongated, tubular body which is longitudinally adjustable by relatively threading said members; said first member being adapted to slidably fit on said tubular housing portion and retained thereon by detent means, said second member encompassing said tool bit and being adapted to engage a work surface to limit advance of said tool bit axially relative to said work surface, and releasable means for locking said first and second members in selected, longitudinally adjusted positions, said locking means being accessible only when said tubular body is removed from said tubular housing portion.

Detailed description

Referring now more specifically to the drawings, a power-operated screwdriver embodying the present invention is illustrated generally at 11 in FIG. 1; however, it is to be understood that this tool is given by way of example only and that the present invention finds use in the general class of rotatable power tools, e.g., drills, screwdrivers, etc., and regardless of whether they are powered pneumatically, electrically or otherwise.

With this in mind, the tool 11 is seen to include a motor housing 13 having a gear case 15 projecting forwardly therefrom and a dependent, pistol grip handle 17 integral therewith. A pneumatic motor (not shown) is positioned within the motor housing 13 and is adapted to impart rotational movement to a tool spindle 21 through a transmission and clutch assembly (not shown) positioned within the gear case 15 and a barrel housing 23, respectively. Transmission and clutch assemblies of this type are well known in the art and do not form any part of the present invention, and for this reason are not illustrated nor described further here. A trigger 25 is provided on the pendant handle 17 to control (through a valve) the flow of compressed air through a conduit 29 to the motor (not shown) and air is exhausted from the motor through a conduit 27. As is customary, the motor housing 13, handle 17, gear case 15 and barrel housing 23 may be constructed from aluminum, magnesium or other metals or alloys thereof, or from non-metallic materials such as, for example, glass fiber materials.

As shown in FIGS. 2 and 3, the spindle 21 extends into a reduced end 31 of the barrel housing 23 and is rotatably supported by a sleeve bearing 33 pressed therein. The forward (or left-hand end of the spindle 21 is socketed and is adapted to receive a complementary shaped shank 35 at one end of a tool bit 37 (here a screwdriver tool bit), so that upon energizing the motor (not shown) and engaging the clutch (not shown), the spindle 21 and the bit 37 rotate conjointly.

The tool bit shank 35 is retained in place within the spindle end 34 by a detent ball 39 disposed in a radial opening 41 in the spindle end 34. The ball 39 is adapted to protrude inwardly of its associated opening 41 and is receivable in an annular groove (not shown) formed in the tool bit shank 35. A retainer sleeve 47 is slidably disposed on the spindle 21 and is adapted to overlay the opening 41 and the ball 39 disposed therein. A compression spring 49 engages a radial flange 51 on the sleeve 47 and biases it toward the left, as seen in FIGS. 2 and 3, so that the sleeve 47 normally seats against a retaining ring 48 as seen in FIG. 6. In this position, the ball 39 holds the tool bit shank 35 within the spindle end 34. However, when the retainer sleeve 47 is moved toward the right to the position shown in FIG. 3, the ball 39 can move radially outwardly of the shank 35 and the tool bit 37 may be removed from the tool 11 simply by pulling axially thereon. This causes the ball 39 to be cammed radially out of the tool shank groove (not shown) whereupon the tool bit 37 can be pulled completely out of the spindle 21. To reinsert the tool bit 37, the sleeve 47 is moved toward the right and the tool bit shank 35 pushed into the spindle 21. The ball 39 is cammed outwardly by the shank 35 until the annular groove therein (not shown) aligns with the balls 39, whereupon by moving the retainer sleeve 47 toward the left, the balls 39 move into the tool shank groove and the tool bit 37 is locked in place.

To manipulate the retainer sleeve 47, a manually operable, actuator collar 53 is slidably disposed on the barrel housing 23 and has one or more pins 55 press fitted thereto and extending radially through elongated slots 57 in the reduced barrel housing end 31. The pins 55 are adapted to engage behind the flange 51 on the retainer sleeve 47 so that by moving the collar 53 from the FIG. 2 position to the FIG. 3 position (or toward the right as seen in these figures), the retainer sleeve 47 is also moved toward the right and the tool bit 37 may be removed from the tool 11 as described above. A compression spring 59 within the collar 53 engages a radially inwardly extending flange 61 thereon and biases the collar 53 toward the left. In the extreme left-hand position for the collar 53 (shown in FIG. 2), the pins 55 seat against a shoulder 63 on the reduced barrel housing end 34.

With tools of this type, i.e. powered screwdrivers, drills and the like, it is often desirable to provide a depth locator device to limit axial advance of the tool 11 and tool bit 37 toward a work surface. For example, when threading a headed fastener into a surface, it is desirable that the fastener head not pull up too tightly against the work surface as either the work surface or the fastener might be damaged.

To this end, an elongated depth locator accessory 65 has its rear end supported on the barrel housing reduced end 31, and its forward end encompassing the tool bit 37. The depth locator 65 includes two primary component parts, namely, a first tubular member 67 slidably disposed on the reduced barrel housing end 31, and a second tubular member 69 encompassing the tool bit 37. The second member 69 includes an enlarged end 71 provided with internal threads 70 which fit on threads 72 on the outer end of the first member 67. The second or outer member 69 preferably has a work surface engaging non-metallic ring 73 constructed of a non-marring material such as, for example, nylon, fitted into a groove 75 in the end thereof to prevent damage to the work surface during use. In addition, the outer member 69 may have a sleeve bearing 77 pressed therein to help support the tool bit 37.

According to an important aspect to the present invention, the depth locator 65 is longitudinally adjustable and is adapted to be locked in selected adjusted positions by means which is accessible only when the locator 65 is removed from the tool barrel housing 23. This prevents the locator 65 from being inadvertently or accidentally adjusted and requires a positive act, i.e. removing the locator 65, to effect adjustment thereof, which makes the locator 65 of the present invention tamper proof. Another important aspect of this invention is that the depth locator 65 is positively retained in place on the barrel housing 23 but, when desired, is quickly and easily, manually removable therefrom.

Thus, as seen in FIGS. 2, 3 and 5, the first locator member 67 has a radially inwardly extending flange 81, at the area of the threads 72. A radial slot 79 extends inwardly from the threads 72 through the flange 81 at one side of the member 67 and defines radial faces 74, 76. A threaded opening 83 extends axially through the flange from a shoulder 84, defined by the flange 81 to the radial face 76 and communicates with the slot 79. A set screw 85, preferably the self-locking type, is threaded into the opening 83 and is adapted to abuttingly engage the radial face 74.

When the set screw 85 is threaded toward the left, as seen in FIGS. 2, 3 and 5, it presses against the face 74 and tends to open up the slot 79. As best seen in FIG. 5, this causes the left flanks of threads 72 to the left of the slot 79 to bear against the left flanks of the corresponding threads 70, and the right flanks of the threads 72 to the right of the slot 79 to bear against the right flanks of the corresponding threads 70 and prevents the members 67, 69 from being threadedly adjusted relative to each other. Conversely, when the set screw 85 is threaded toward the right, as seen in these figures, away from the face 74, the stresses on the member 67 tending to open the slot 79 are relaxed and the members 67, 69 can again be threadedly adjusted relative to each other.

Since the set screw 85 is within the member 67, it is accessible only when the depth locator 65 is removed from the tool 11. This, as described above, makes the depth locator 65 tamper proof.

As shown in FIGS. 2 and 3, the depth locator 65 is detachably secured to the barrel housing reduced end 31 by detent means comprising a plurality of balls 86 carried in radial openings 87 in the member 67, the balls 86 being receivable in an annular groove 89 formed in the barrel housing end 31. Radial inward movement of the balls 86 is limited by an annular lip on the member 67 while a split, annular spring 91 prevents the balls from falling out of the openings 87. In addition, the actuator collar 53 has a forwardly projecting flange 93 which, when the member 67 is on the barrel housing end 31 and the balls 86 in the groove 89, overlays the spring 91 and prevents the balls 86 from coming out of the groove 89. This forms a positive retention for holding the depth locator 65 to the tool 11. However, when it is desired to remove the depth locator 65 from the tool, the collar 53 is moved toward the right, as seen in FIGS. 2 and 3, so that the flange 93 is spaced from the spring 91. Then, by pulling axially toward the left on the depth locator 65, the balls 86 are caused to ride up the groove 89 whereupon the depth locator 65 can be completely removed. To reassemble the locator 65 to the tool 11, the collar 53 is moved to the right and the member 67 is slipped over the barrel housing end 31 until the balls 86 fall into the groove 89 under the action of the split spring 91. In this position of the parts, shoulder 84 seats against the barrel housing end 31. Then, by releasing the collar 53, the flange 93 moves over the spring 91 and the depth locator is locked in place.

A modified form of the invention is seen in FIG. 6. In this embodiment, wherein like numerals denote like parts, the split spring 91 is dispensed with. Instead, the member 67 has a projecting flange 95 partially overlaying the balls 86 to prevent them from falling out of the openings 87. Also, a relatively longer non-marring member 73A is provided and is threaded into the depth locator member 69. This member also acts as a bearing to support a bit such as the one shown in the embodiment of FIGS. 1–5. In all other respects, this embodiment is substantially identical to that shown and described above for FIGS. 1–5.

By the foregoing, there has been disclosed an improved attaching and adjusting construction for a depth locating accessory calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. In a power-operated tool of the type having a housing, a spindle rotatably supported within said housing and adapted for operative connection to a power source, said spindle adapted to have a tool bit coupled thereto for rotation therewith, and depth locator means engageable with a work surface for limiting the advance of said tool bit relative thereto; the improvement wherein said depth locator means comprises first and second relatively longitudinally adjustable members and together forming an elongated body having a rearward end positionable on said housing and a forward end adapted to encompass said tool bit, cooperable detent means on said body rearward end and said housing for retaining said body on said housing, and releasable means for locking said first and second members together in selected longitudinally adjusted positions, said locking means being accessible only when said body is removed from said housing.

2. The improvement of claim 1 wherein said first and second members are threadedly interconnected, said locking means being adapted to prevent relative threading between said first and second members.

3. The improvement of claim 2 wherein said elongated body is generally tube-like in configuration, said first member being slidably disposed on said housing, and said locking means being within said first member.

4. The improvement of claim 2 wherein said first and second members include threadedly interconnected portions, said locking means being adapted to deform one of said threaded portions relative to the other thereby locking said threaded portions together.

5. The improvement of claim 3 wherein said second member threadedly receives the outer end of said first member, said outer end being radially enlarged in an inward direction and carrying said locking means.

6. The improvement of claim 4 wherein said one threaded portion is slotted radially, said locking means engaging said one threaded portion on both sides of said slot and being adapted to change the axial dimension of said one threaded portion.

7. The improvement of claim 6 wherein said locking means includes a screw threaded axially into said one threaded portion on one side of said slot and adapted to abuttingly engage said one threaded portion on the other side of said slot.

8. The improvement of claim 1 which includes anti-marring means screwed to said depth locator means at its forward end.

9. The improvement of claim 1 which includes manually operable means for blocking release of said detent means.

10. The improvement of claim 9 wherein said manually operable means includes a collar on said housing and movable from a first position, where it blocks release of said detent means, to a second position where it permits manual release of said detent means.

11. The improvement of claim 10 wherein said tool includes another detent means on said spindle adapted to cooperate with and retain said tool bit within said spindle, releasable retainer means adapted to block release of said another detent means, said manually operable means being engageable with and adapted to release said retainer means.

12. The improvement of claim 10 which includes means normally biasing said manually operable means toward said first position.

13. A power-operated tool comprising a housing having a forward, tubular portion, drive means within said housing, a spindle extending forwardly into said tubular housing portion and adapted to be rotated by said drive means, said spindle being adapted to have a tool bit coupled thereto for rotation therewith, depth locator means including first and second threadedly interconnected members together defining an elongated, tubular body which is longitudinally adjustable by relatively threading said members, said first member being adapted to slidably fit on said tubular housing and retained thereon by detent means, said second member encompassing said tool bit and being adapted to engage a work surface to limit advance of said tool bit axially relative to said work surface, and releasable means for locking said first and second members in selected, longitudinally adjusted positions, said locking means being accessible only when said tubular body is removed from said tubular housing portion.

14. A construction as defined in claim 13 wherein said second member has a threaded portion receiving a threaded portion on said first member, said first member threaded portion being radially enlarged in an inward direction, a radial slot formed in said first member threaded portion and intermediate the axial ends of said radial enlargement, said locking means comprising a screw threaded axially into said radial enlargement to one side of said slot and engaging said radial enlargement at the other side of said slot.

15. A construction as defined in claim 13 wherein said locking means includes means for deforming one of said members relative to the other of said members at the region of threaded interconnection thereof.

16. A construction as defined in claim 13 wherein said detent means includes a plurality of balls carried by said first member and receivable in a groove formed in said tubular housing portion, said balls being adapted to move radially outwardly to release said first member from said tubular housing portion.

17. A construction as defined in claim 16 which includes resilient means substantially encompassing said first member and engaging said balls to normally bias them radially inwardly of said first member, and a collar in said tubular housing member and normally overlaying said resilient means, said collar being movable away from said resilient means to permit radial outward movement of said balls.

18. A construction as defined in claim 13 which includes a collar adapted normally to overlay said detent means and prevent removal of said depth locator from said tubular housing portion, said collar being manually movable away from said detent means to permit removal of said depth locator from said tubular housing portion.

19. A construction as defined in claim 18 wherein said collar is slidably disposed on said tubular housing portion, and resilient means normally biasing said collar toward said overlaying position.

20. A construction as defined in claim 19 which includes another detent means on said spindle and adapted to engage a tool bit, retainer means on said spindle normally overlaying said another detent to prevent removal of said tool bit, said collar being adapted to operatively engage said retainer means and move said retainer means away from said another detent means thereby permitting manual withdrawal of said tool bit.

21. The improvement of claim 1 which includes bearing means in said forward end and adapted to rotatably support said tool bit.

22. A construction as defined in claim 13 which includes bearing means in said second member for rotatably supporting said tool bit.

References Cited

UNITED STATES PATENTS

| | | | |
|---|---|---|---|
| 2,402,353 | 6/1946 | Trautmann | 77—55 |
| 2,422,279 | 6/1947 | Zimmer | 77—55 |
| 2,670,644 | 3/1954 | Du Sell | 144—32 |
| 2,790,471 | 4/1957 | Graybill | 144—32 |
| 2,796,161 | 6/1957 | Graybill | 144—32 |
| 2,940,488 | 6/1960 | Riley | 144—32 |

GERALD A. DOST, *Primary Examiner.*

U.S. Cl. X.R.

77—55